June 16, 1964   R. R. GREENWOOD   3,137,273
ANIMAL HOLDING DEVICE
Filed June 4, 1962
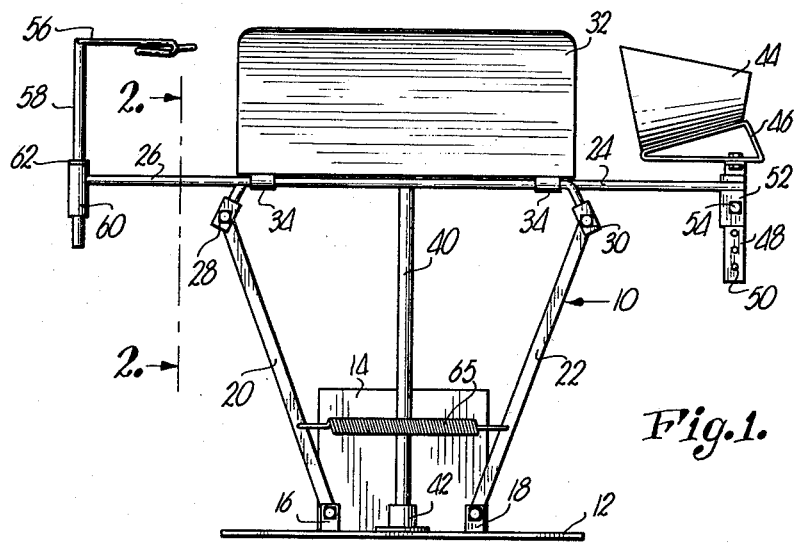
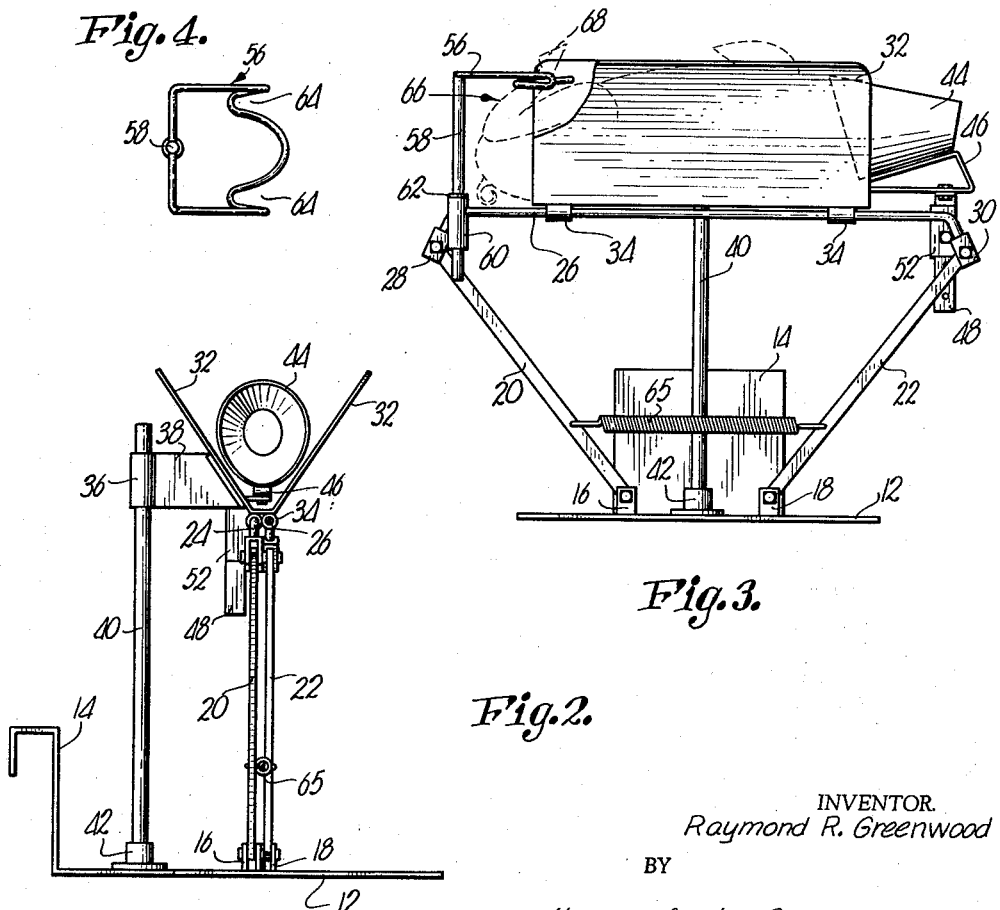
INVENTOR.
Raymond R. Greenwood
BY
Hovey, Schmidt, Johnson & Hovey
ATTORNEYS.

— # United States Patent Office 3,137,273
Patented June 16, 1964

3,137,273
ANIMAL HOLDING DEVICE
Raymond R. Greenwood, R.R. 1, Blythedale, Mo.
Filed June 4, 1962, Ser. No. 199,975
8 Claims. (Cl. 119—103)

This invention relates to animal holding means, and more particularly, to structure for supporting a small animal such as a pig, on its back so that medical operations in the nature of vaccination and castration may be performed. This invention also represents an improvement over my disclosure set forth in U.S. Letters Patent No. 2,914,026, entitled "Animal Holding apparatus."

In the above-mentioned patent, structure was provided for receiving a small animal on its back and included a trough-shaped receiver having a swingable clamp thereon adapted for engaging the animal across its stomach when the animal was disposed upon its back. Although this structure has proven to be satisfactory in many cases, it has been found that if the head and rear legs of the animal are fixedly positioned, the aforesaid medical operations may be performed more readily and with greater skill since the performance of the operations are then not interfered with by the head and rear legs.

Accordingly, the present invention is directed to an animal holding device having a vertically shiftable animal receiver, and further provided with head and rear leg-supporting means thereon for preventing movements of the head and rear legs during medical operations on the animal while at the same time maintaining the animal in a fixed position on its back within the receiver.

It is, therefore, the primary object of the present invention to provide an animal holding device having an animal receiver and head and rear leg supporting means thereon adjacent the ends of the receiver whereby the head and legs of the animal are fixedly positioned while the animal is disposed within the receiver upon its back, all to the end that the animal is substantially bound to the receiver and incapable of movement with respect thereto.

Another object of the present invention is the provision of a receiver of the aforesaid character which is vertically shiftable, and wherein the head and leg-supporting members are shiftably carried by the receiver for movement toward the center of the receiver as the latter moves downwardly, whereby the weight of the animal disposed within the receiver is sufficient to draw the head and leg-supporting members together into head and leg-supporting positions, thus maintaining the animal substantially immovable during the operations performed thereon.

Other objects of the present invention will become apparent as the following specification progresses, reference being had to the accompanying drawing, wherein:

FIGURE 1 is a side elevational view of the animal holding device of the present invention and illustrating the position thereof prior to receiving an animal to be held;

FIG. 2 is an end elevational view of the animal holding device in the position of FIG. 1;

FIG. 3 is a side elevational view of the animal holding device in an operative position with a small animal held thereby; and FIG. 4 is a top plan view of the rear leg-supporting means forming a part of the animal holding device for maintaining the rear legs of an animal in a fixed position when the animal is held by the holding device.

The animal holding device of the present invention is broadly denoted by the numeral 10 and includes a base 12 in the nature of a flat plate. A hook 14 is integral with base 12 and is adapted to be operably coupled with a beam or the like for supporting base 12 above ground level.

Base 12 is provided with a first pair of lugs 16 on the normally uppermost surface thereof, and a second pair of lugs 18 on the upper surface thereof in spaced relationship to first lugs 16. A pair of links 20 and 22 are pivotally mounted at corresponding ends thereof between respective lugs 16 and 18 as is clear in FIGS. 1 and 2. A pair of substantially L-shaped rods 24 and 26 are pivotally mounted at ends 28 and 30 respectively to the normally uppermost ends of links 20 and 22 respectively. Links 20 and 22 are, therefore, capable of swinging in vertical planes and, as shown in FIG. 2, the plane of link 20 is offset, but substantially parallel with the plane of link 22.

Animal receiver 32 is operably coupled with rods 24 and 26 and is adapted to receive therewithin a small animal, such as a pig or the like. Receiver 32 is provided with a pair of sleeves 34 thereon adjacent each end thereof and at the apex of the sides thereof. Each sleeve 34 at one end of receiver 32 is aligned with a corresponding sleeve 34 at the opposite end of receiver 32 so that rods 24 and 26 pass through correspondingly aligned sleeves 34 to interconnect receiver 32 to links 20 and 22.

A tube 36 is carried by means of a bracket 38 on receiver 22 and is normally disposed between the latter and hook 14, as shown in FIG. 2. Tube 36 is normally vertically aligned when receiver 32 is in an operative position to receive an elongated guide 40 fixed at the lowermost end by means of a flanged collar 42 to the upper surface of base 12, it being noted that guide 40 is freely slidable within tube 36. Tube 36 is spaced sufficiently outwardly of the corresponding side of receiver 32 to permit clearance between the upper marginal edge of the side and guide 40.

A head-supporting member 44 is carried by means of a mount 46 on the end of rod 24 opposite to end 28 thereof. Member 44 is in the nature of a frustum of a cone with the larger diameter end thereof adjacent the corresponding end of receiver 32. An L-shaped bar 48 having a number of perforations 50 along the length thereof, interconnects mount 46 with a bracket 52 rigid to rod 24 in any suitable manner. A pin 54 carried by bracket 52, may be received in any one of perforations 50 for disposing member 44 in any one of a number of fixed positions with respect to rod 24.

Leg-supporting means in the nature of a leg shackle 56 is carried adjacent the opposite end of receiver 32 by an upright standard 58 within a pipe 60 rigid to the end of rod 26 opposite to end 30 thereof. Standard 58 is provided with an annular shoulder 62 thereon of a diameter at least equal to the diameter of pipe 60 so that shackle 56 may be disposed in a fixed position with respect to rod 26. Shoulder 62 may be adjustably disposed along standard 58 so that shackle 56 may be raised and lowered to accommodate animals of differing sizes in device 10.

As shown in FIG. 4, shackle 56 is provided with a pair of rear leg-receiving notches 64 therein which face receiver 32 and which receive the rear legs of an animal carried within receiver 32.

A coil spring 65 is secured at the ends thereof to links 20 and 22 for biasing receiver 32 upwardly into the position illustrated in FIG. 1, so that receiver 32 is maintained in the position ready for receiving an animal. Spring 65 expands when an animal is carried within receiver 32, as is clear in FIG. 3.

In operation, device 10 is initially disposed in the position illustrated in FIG. 1. An animal, such as a small pig or the like, is disposed within receiver 32 on its back so that the head of the animal is adjacent member 44, and the rear legs are adjacent shackle 56. In such case, member 44 serves as a retainer for the snout of the pig and is shaped to conform to the general configuration of the snout of the pig.

The weight of the small animal or pig is sufficient to cause receiver 32 to be lowered. At the same time, member 44 and shackle 56 move toward receiver 32 until the nose or snout of the animal is firmly received within member 44 and the rear legs are received within notches 64. The animal held by device 10 is shown in dashed lines in FIG. 3 and is denoted by the numeral 66. The rear legs 68 of animal 66 are received within notches 64 of shackle 56 and bend forwardly toward the front legs and head of animal 66.

It is to be noted that receiver 32 moves downwardly only until member 44 and shackle 56 are rendered immovable as a result of engaging the head and rear legs respectively of animal 66. The engagement of animal 66 with member 44 and shackle 56 is not injurious to animal 66, notwithstanding the fact that animal 66 is firmly bound within receiver 32 on its back by member 44 and shackle 56. Medical operations may then be performed on animal 66.

At the conclusion of an operation, the animal may be removed from device 10 by raising receiver 32 to shift member 44 and shackle 56 away from the animal to free the latter and to permit the removal of the animal from receiver 32.

Having thus described the invention, what is claimed as new and desired to be secured by Letters Patent is:

1. A pig holder comprising:
a pig receiver;
shiftable structure coupled with the receiver for mounting the latter for up and down movement;
a movable pig snout retainer at one end of the receiver; and
means coupled with said structure and with the retainer for moving the latter toward the opposite end of the receiver and into a position for receiving and retaining the snout of a pig disposed in said receiver in response to downward movement of the receiver.

2. A pig holder comprising:
a pig receiver;
shiftable structure coupled with the receiver for mounting the latter for up and down movement;
a movable pig snout retainer at one end of the receiver;
a leg shackle at the opposite end of the receiver; and
means coupled with said structure and with the retainer for moving the latter toward the shackle and into a position for receiving and retaining the snout of a pig disposed in said receiver in response to downward movement of the receiver.

3. A pig holder comprising:
a pig receiver;
shiftable structure coupled with the receiver for mounting the latter for up and down movement;
a movable leg shackle at one end of the receiver; and
means coupled with said structure and with the shackle for moving the latter toward the opposite end of the receiver and into a position for receiving and retaining the legs of a pig disposed in said receiver in response to downward movement of the receiver.

4. A pig holder comprising:
a pig receiver;
shiftable structure coupled with the receiver for mounting the latter for up and down movement;
a movable leg shackle at one end of the receiver;
a pig snout retainer at the opposite end of the receiver; and
means coupled with said structure and with the shackle for moving the latter toward the retainer and into a position for receiving and retaining the legs of a pig disposed in said receiver in response to downward movement of the receiver.

5. A pig holder comprising:
a pig receiver;
shiftable structure coupled with the receiver for mounting the latter for up and down movement;
a movable pig snout retainer at one end of the receiver;
a movable leg shackle at the opposite end of the receiver; and
means coupled with the retainer, the shackle and said structure for moving the retainer and the shackle toward each other and into positions for receiving and retaining the snout and legs respectively of a pig disposed in said receiver in response to downward movement of the receiver.

6. A pig holder as set forth in claim 5, said structure including a base, linkage means pivotally mounted on the base for interconnecting the latter with said receiver, and guide means operably coupled with said base and said receiver for directing the latter along a vertical path of travel.

7. A pig holder as set forth in claim 6, wherein is included a pair of rods shiftably mounted on the receiver and operably coupled with said linkage means, said retainer and said shackle being coupled to corresponding rods and movable in response to the pivotal action of said linkage means.

8. A pig holder as set forth in claim 6, and resilient means coupled with said linkage means for biasing the latter in a direction to urge said receiver upwardly.

References Cited in the file of this patent

UNITED STATES PATENTS

| | | |
|---|---|---|
| 1,517,573 | Momyer | Dec. 2, 1924 |
| 1,812,892 | Merrifield | July 7, 1931 |
| 2,663,283 | Julius | Dec. 22, 1953 |
| 2,829,622 | Borthwick | Apr. 8, 1958 |
| 3,043,269 | Kausche | July 10, 1962 |

FOREIGN PATENTS

| | | |
|---|---|---|
| 219,390 | Australia | Dec. 19, 1958 |
| 222,776 | Australia | July 13, 1959 |
| 676,097 | Great Britain | July 23, 1952 |